US010031727B1

(12) United States Patent
Roman et al.

(10) Patent No.: US 10,031,727 B1
(45) Date of Patent: Jul. 24, 2018

(54) HOME DEVICE APPLICATION PROGRAMMING INTERFACE

(71) Applicant: Essential Products, Inc., Palo Alto, CA (US)

(72) Inventors: Manuel Roman, Sunnyvale, CA (US); Mara Clair Segal, San Francisco, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

(*) Notice: Subject to any disclaimer, the term of this patent is extended or adjusted under 35 U.S.C. 154(b) by 0 days.

(21) Appl. No.: 15/696,010

(22) Filed: Sep. 5, 2017

Related U.S. Application Data

(63) Continuation of application No. 15/608,954, filed on May 30, 2017, now Pat. No. 9,747,083.

(60) Provisional application No. 62/449,492, filed on Jan. 23, 2017, provisional application No. 62/512,658, filed on May 30, 2017.

(51) Int. Cl.
| | |
|---|---|
| *G06F 9/44* | (2018.01) |
| *G06F 8/34* | (2018.01) |
| *G06F 8/30* | (2018.01) |
| *G06N 99/00* | (2010.01) |
| *G06F 8/20* | (2018.01) |

(52) U.S. Cl.
CPC .............. *G06F 8/34* (2013.01); *G06F 8/20* (2013.01); *G06F 8/30* (2013.01); *G06N 99/005* (2013.01)

(58) Field of Classification Search
CPC .... G06F 8/20; G06F 8/30; G06F 8/34; G06N 99/005

USPC ................................................... 717/106-109
See application file for complete search history.

(56) References Cited

U.S. PATENT DOCUMENTS

| | | | |
|---|---|---|---|
| 6,393,496 B1 | 5/2002 | Schwaderer et al. | |
| 6,507,762 B1* | 1/2003 | Amro | G08C 19/28 700/83 |
| 6,546,419 B1 | 4/2003 | Humpleman | |
| 7,243,355 B2 | 7/2007 | Espino et al. | |
| 8,613,002 B2 | 12/2013 | Narayanan et al. | |
| 9,621,433 B2 | 4/2017 | Yoshida et al. | |
| 9,747,083 B1 | 8/2017 | Roman et al. | |
| 9,838,830 B2 | 12/2017 | Lyons et al. | |
| 9,846,577 B1 | 12/2017 | Riedl | |
| 2002/0056112 A1* | 5/2002 | Dureau | H04H 20/08 725/78 |
| 2007/0083827 A1* | 4/2007 | Scott | G06F 9/4443 715/811 |
| 2010/0036667 A1* | 2/2010 | Byford | G06F 19/327 704/270 |

(Continued)

OTHER PUBLICATIONS

Non-Final Office Action dated Dec. 21, 2017 for U.S. Appl. No. 15/696,033 of Roman, M. et al., filed Sep. 5, 2017.

(Continued)

*Primary Examiner* — Qing Chen
(74) *Attorney, Agent, or Firm* — Perkins Coie LLP

(57) ABSTRACT

The present disclosure contemplates a variety of improved methods and systems for enabling developers to program and control a variety of disparate devices coupled to the framework and/or ambient operating system. The Home API can expose operation of the devices in a natural and intuitive manner, facilitating control of unknown devices by high-level commands.

26 Claims, 18 Drawing Sheets

(56) References Cited

U.S. PATENT DOCUMENTS

| | | | | |
|---|---|---|---|---|
| 2013/0311946 | A1* | 11/2013 | Kwon | G06F 3/04817 715/811 |
| 2014/0074483 | A1* | 3/2014 | van Os | G10L 15/22 704/275 |
| 2014/0218372 | A1* | 8/2014 | Missig | G06F 3/044 345/473 |
| 2015/0095790 | A1 | 4/2015 | Yoshida et al. | |
| 2015/0162000 | A1* | 6/2015 | Di Censo | G10L 15/22 704/270.1 |
| 2015/0373149 | A1 | 12/2015 | Lyons | |
| 2015/0373183 | A1* | 12/2015 | Woolsey | G06F 17/289 348/14.08 |
| 2016/0042737 | A1* | 2/2016 | Emerick | G06F 19/327 704/270.1 |
| 2016/0098992 | A1* | 4/2016 | Renard | G10L 15/18 704/275 |
| 2016/0203415 | A1* | 7/2016 | Chaiyochlarb | G06N 99/005 706/11 |
| 2016/0378747 | A1* | 12/2016 | Orr | G06F 3/167 704/9 |
| 2017/0133012 | A1* | 5/2017 | Ho | G10L 15/22 |
| 2017/0133013 | A1* | 5/2017 | Tsai | G10L 15/063 |
| 2017/0351505 | A1 | 12/2017 | Riedl | |

OTHER PUBLICATIONS

Non-Final Office Action dated Jan. 11, 2018 for U.S. Appl. No. 15/672,216 of Roman, M. et al., filed Aug. 8, 2017.
Notice of Allowance dated Jul. 26, 2017 for U.S. Appl. No. 15/608,954 of M. Roman, et al. filed May 30, 2017.
U.S. Appl. No. 15/667,351 of Roman, M. et al., filed Aug. 2, 2017.
U.S. Appl. No. 15/672,216 of Roman, M. et al., filed Aug. 8, 2017.
U.S. Appl. No. 15/696,033 of Roman, M. et al., filed Sep. 5, 2017.
Bandara, Syafril, et al., "Access Control Framework for API-Enabled Devices in Smart Buildings", IEEE, 2016, pp. 2010-217.
Sohn, Youngchul, et al., "Device Control With Scriptable-API Using Web Based Framework", IEEE, 2008, 2 pages.

* cited by examiner

HOME DEVICE APPLICATION PROGRAMMING INTERFACE

CROSS-REFERENCE TO RELATED APPLICATION(S)

This application is a continuation application of U.S. patent application Ser. No. 15/608,954 (now U.S. Pat. No. 9,747,083), entitled "HOME DEVICE APPLICATION PROGRAMMING INTERFACE," by Roman et al., and filed May 30, 2017, which claims priority to U.S. Provisional Patent Application No. 62/449,492, entitled "HOME API," by Roman et al., and filed on Jan. 23, 2017, both of which are incorporated herein by reference in its entirety. Additionally, this application claims priority to U.S. Provisional Patent Application No. 62/512,658, entitled "HOME DEVICE APPLICATION PROGRAMMING INTERFACE," by Roman et al. and filed on May 30, 2017, which is incorporated herein by reference in its entirety.

TECHNICAL FIELD

The present disclosure contemplates a variety of improved methods and systems for enabling developers to program and control a variety of disparate home devices coupled to the framework and/or ambient operating system.

BACKGROUND

The Internet of Things (IoT) allows for the internetworking of devices to exchange data among themselves to enable sophisticated functionality. For example, assistant devices configured for home automation can exchange data with other devices to allow for the control and automation of lighting, air conditioning systems, security, etc. Existing solutions require users to select individual devices and ascribe settings to them one-by-one, potentially within a menu format.

SUMMARY

The present disclosure contemplates a variety of improved methods and systems for enabling developers to program and control a variety of disparate home devices coupled to the framework and/or ambient operating system (AmbientOS). This home application programming interface (API) exposes the operation of the home devices in a natural and intuitive manner, facilitating control of unknown devices by high level commands. The home devices are contextually responsive to API commands.

Some of the subject matter described herein includes a method for seamlessly and automatically building an application using an application programming interface (API) to interface with one or more devices within an environment with an assistant device having artificial intelligence (AI), comprising: receiving, via a processor, a graphic representing a layout of one or more graphical user interface (GUI) elements for the application to instruct the assistant device to control the one or more devices within the environment; identifying a section of the graphic corresponding to the one or more of the GUI elements that is to be a selectable item on the application to implement a functionality to be performed within the environment using the assistant device, the section identified based on a change in color between a background color of the graphic and a section color of the graphic; identifying graphical content within the section; determining object characteristics of the graphical content within the section corresponding to the one or more of the GUI elements that is to be the selectable item on the application to implement the functionality to be performed within the environment using the assistant device, the object characteristics including a type of object corresponding to the graphical content, a position of the graphical content within the section, a size of the graphical content in relation a size of the section, a relationship between the position of the graphical content with other graphical content within the section, or a graphical content color; identifying textual content within the section; determining text characteristics of the textual content, the text characteristics of the textual content including one or more of a meaning of the textual content, a size of the textual content, a font of the textual content, a relationship between a position of the textual content and the position of the graphical content, or the position of the textual content within the section; determining the functionality associated with the section based on the text characteristics of the textual content and the object characteristics of the graphical content; identifying the one or more devices capable of performing the functionality within the environment; and generating the application having the section of the graphic, wherein the section when selected instructs the assistant device to cause the identified one or more devices to perform the functionality.

Some of the subject matter described herein includes a method comprising: receiving, via a processor, a graphic representing a layout of one or more graphical user interface (GUI) elements for an application to instruct an assistant device to control one or more devices within an environment; identifying a section of the graphic corresponding to the one or more of the GUI elements that is to be a selectable item on the application to implement a functionality to be performed within the environment using the assistant device; determining characteristics of a graphical content of the graphic wherein the graphical content can include a depiction of an object or a text; determining the functionality and the one or more devices associated with the section, the functionality to be performed within the environment using the assistant device based on the characteristics of the graphical content; and generating the application having the section of the graphic, wherein the section when selected instructs the assistant device to cause the one or more devices to perform the functionality.

Some of the subject matter described herein includes an electronic device, comprising: one or more processors; a database storing characteristics of graphical content, a functionality, and device categories; and memory storing instructions, execution of which by the one or more processors cause the electronic device to: receive a graphic representing a layout of one or more graphical user interface (GUI) elements for an application to instruct an assistant device to control one or more devices within an environment; identify a section of the graphic corresponding to the one or more of the GUI elements that is to be a selectable item on the application to implement the functionality to be performed within the environment using the assistant device; determine characteristics of the graphical content of the graphic wherein the graphical content can include a depiction of an object or a text; determine using the database, the functionality, and the one or more devices associated with the section, the functionality to be performed within the environment using the assistant device based on the characteristics of the graphical content and the device categories; and generate the application having the section of the graphic, wherein the section when selected instructs the assistant device to cause the one or more devices to perform the functionality.

DETAILED DESCRIPTION

This disclosure contemplates a variety of improved methods and systems of a development environment associated with an assistant device. In at least one embodiment, the development environment is the home device application programming interface (Home API). The described development environment can include procedures and tools for developing, debugging, and testing applications, apps, and/or commands to customize a user's home. For example, a developer wanting to create an application for controlling all lighting devices in the home can use the developer environment to create the app. In at least one embodiment, the home can be the environment surrounding the assistant device such as a house, an office, a car, and/or a store. The generated applications can include mobile applications (apps).

A home can include many different electronic devices capable of providing different functionalities. For example, a home can include lights, thermostat, a smart TV, and a coffee maker. These devices can be given different functionalities such as turning on the lights, changing the temperature, turning off the news, and making coffee. The devices can be configured to connect (e.g., via Wi-Fi, Bluetooth, etc.) to the assistant device, and the assistant device can be configured to control the devices. For example, a user can tell the assistant device "please turn off the TV"; in response, the assistant device can send a request to the TV, causing the TV to be turned off. In another example, the user can tell the assistant device "please turn off all the lights in the home"; in response, the assistant device can send a request to all the lights, causing all the lights in the home environment to be turned off. This configuration can save the user time by controlling devices through the assistant device instead of physically operating the individual devices.

The developer environment allows users and/or developers to build on the assistant device infrastructure by providing development tools, routines, protocols, and resources to simplify developing, debugging, and testing applications, apps, and/or commands to customize their homes. For example, the developer can use the home API to create an application for a smartphone (communicatively coupled to the assistant device) which can control all the lights in the home.

Figure 1:
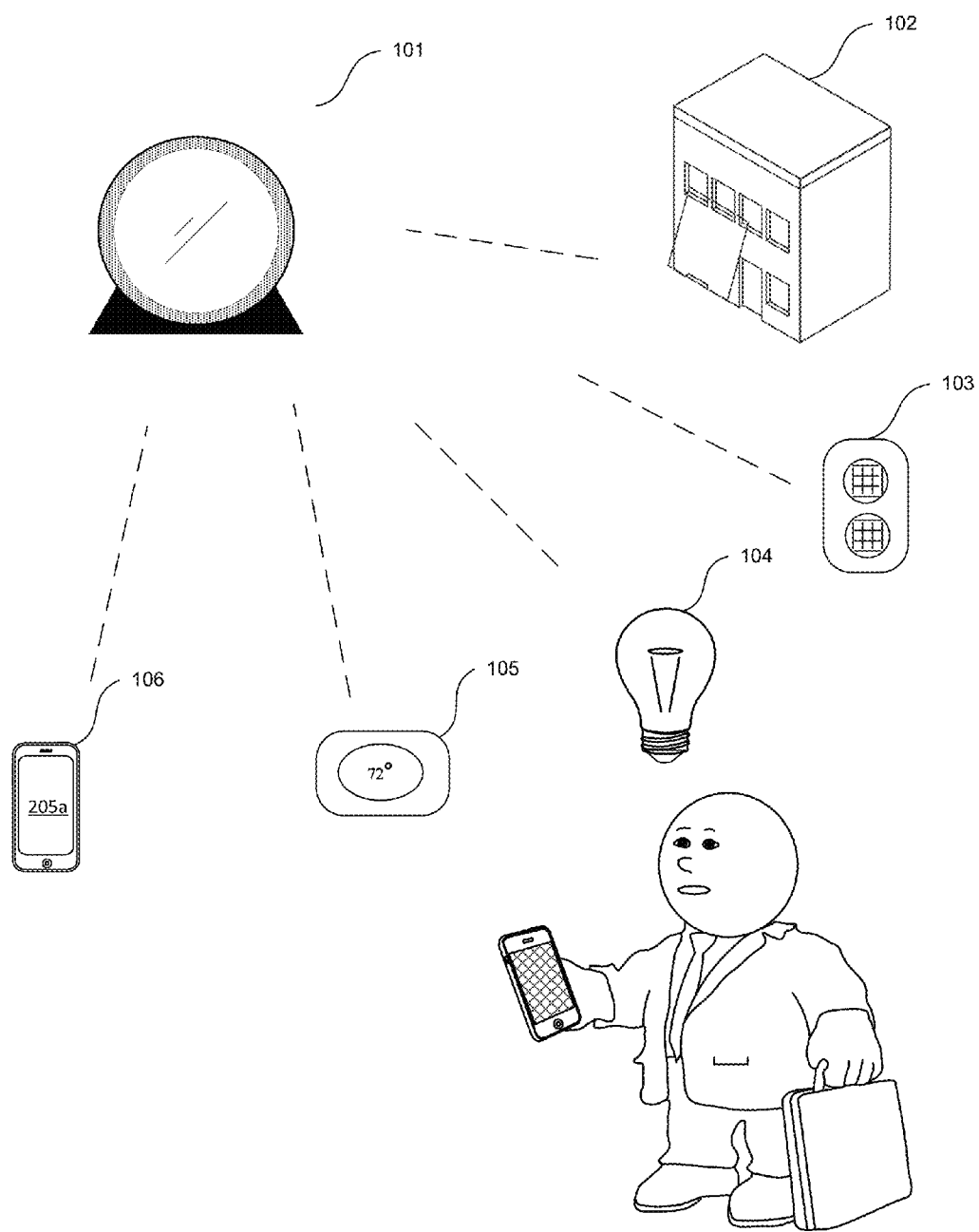
FIG. 1 illustrates an embodiment of the assistant device connected to a device.

FIG. 1 illustrates an embodiment of the assistant device connected to other devices. The assistant device 101 is connected to one or more devices. Devices can include one or more connected devices such as garage doors 102, speakers 103, lights 104, thermostats 105, and mobile devices 106. Devices can also include household appliances such as freezers, ovens, air purifiers, washers, and dryers. In at least one embodiment, the devices are devices such as wearable devices, and/or robots such as robotic vacuums.

Devices can be connected to the assistant device physically and/or via a wireless signal. In at least one embodiment, the wireless signal can include one or more of Long-Term Evolution (LTE), LTE-Advanced, Wi-Fi, Bluetooth, ZigBee, EnOcean, Personal area networks, TransferJet, Ultra-wideband, WiMAX, HiperMAN, Li-Fi and/or infrared radiation (IR).

Each connected device can be controlled using an associated adapter and/or driver. The adapter can be device-specific and, in at least one embodiment, functionality specific. For example, a thermostat may have an associated adapter which the assistant device can use to operate or control the thermostat. In an example, the assistant device may have an adapter for each of the functionalities of the thermostat (e.g., raise temperature, lower temperature, turn on fan, etc.). The adapters can be stored on local resources (e.g., assistant device memory, assistant device external memory, etc.) and/or on remote resources (e.g., cloud, etc.).

In at least one embodiment, the assistant device can access a database which stores a list of connected devices and one or more of the associated adapters, one or more voice activatable commands, activity types, device descriptions, device categories, and/or device location. The database can also be stored on the local resources of the assistant device. In at least one embodiment, the database can be stored externally from the assistant device. For example, the database entry associated with the thermostat can be a reference to the thermostat adapter, voice activatable commands (e.g., "set temperature," "turn on fan," etc.), device description (e.g., "thermostat"), device category (e.g., "temperature regulation"), and/or device location (e.g., "living room," etc.).

Connected devices can be controlled by the user via the assistant device. For example, a user can instruct the assistant device verbally "assistant device, please turn on the television." In response, the assistant device can parse the user instruction using a speech recognition algorithm. The voice activatable command "turn on" and the device description "television" can be used to identify the specific device. The assistant device can then transmit a command to the television requesting it to perform the function of "turning on," thereby causing the television to turn on.

In at least one embodiment, the speech recognition algorithm can include one or more of Hidden Markov models, dynamic time warping-based speech recognition, neural networks, deep feedforward neural networks, end-to-end Automatic Speech Recognition (ASR), and/or other similar algorithms.

In some implementations, a home assistant device with artificial intelligence (AI) capabilities can receive audio data as voice input from a user and provide audio data as voice output, thereby responding to the user via spoken language. The home assistant device can also manipulate other devices within the home, for example, turn on or off devices (e.g., light bulbs), increase volume of a television, adjust the temperature setting of a thermostat, etc.

For example, the home assistant device can be requested to play back music using its own speaker or speakers elsewhere within the home, or a combination of both. In some implementations, as the home assistant device or other devices with speakers are playing back music, the characteristics of that music can be adjusted based on the activities of people within the environment. For example, if two people are having a conversation, then this can be detected by the home assistant device (e.g., via its microphones, or the microphones of other devices within the home that the home assistant device has access to) and the volume of the music can be adjusted such that it is lower, allowing the people to easily have a conversation with background music being unobtrusive. In some implementations, the speed of the playback of the music can be adjusted (e.g., made slower), play back of some frequency ranges of the music can be changed (e.g., sounds within a lower bass frequency range might be reduced in volume while sounds within a higher treble frequency range might remain the same as before the conversation was started), etc.

In another example, the home assistant device can determine when a user is getting ready in the morning to leave the home, for example, to go to work or a social engagement. For example, the home assistant device can determine whether a user has awaken by picking up sounds of the user rustling out of bed, brushing his or her teeth, etc. In another example, if the bathroom light is turned on within a threshold time range (e.g., 6:00 AM to 10:00 AM), then this determination by the home assistant device can indicate that a user has awakened. The home assistant device can then access a user's calendar, either online in the cloud or stored locally on the home assistant device or the user's smartphone, and determine when the user's first appointment for the day upon waking up is. The home assistant device can determine the location of the home and the location of where the user needs to go (e.g., the workplace on a weekday morning) and then determine the traffic between the two locations and determine what time the user should be leaving in order to arrive on time. When the user is still within the home and approaching the time to leave, the home assistant device can inform the user in a variety of different ways. For example, it can play a noise, begin to blink its screen or light emitting diodes (LEDs) or other lighting, or even cause other devices to function differently, for example, by causing lights in the room that the user is determined to be within to start blinking. For example, if the user is within the restroom, then the restroom lights can begin blinking, dim, or cycle between dim-to-normal brightness, the other appliances in the restroom can be operated (e.g., the toilet may flush, the toothbrush can begin vibrating by actuating accelerometers), etc. as instructed by the home assistant device. In some embodiments the assistant device can include an alarm feature which can control devices in the environment. For example, the assistant device can cause the lighting devices in the home to blink when the alarm is triggered. In some embodiment the assistant device can identify the location of the user associated with the alarm and only cause the lights in the user's vicinity to blink. In some embodiments the assistant device can account for the time it takes a user to get ready to leave home. For example if user A takes 30 minutes to prepare to leave home, the assistant device can notify the user A 30 minutes prior to required departure.

In some implementations, the home assistant device can determine that the user has deviated from an expected schedule of behaviors that typically occur within the home. For example, if the user usually operates a toothbrush within ten minutes of waking up, this can be determined. If the user later wakes up, enters the restroom, leaves the restroom, and then begins to make coffee, the home assistant device can determine that the user did not operate the toothbrush. The home assistant device can then alert the user, for example, by generating a notification on its display screen via a graphical user interface (GUI), send the user a text message receivable via their smartphone, or operate devices to alert the user similar to the features described above regarding informing the user when to leave to arrive to a location on time. The assistant device can also identify significant dates in a user's life and can create associated tasks for the user. For example if a user has a wedding anniversary on September 30th, the assistant device can add a task of "buy anniversary gift" prior to September 30th.

In some embodiments the assistant device can be initiated by a tap, or glance. The tap can be identified by the assistant device via textile feedback on the assistant device screen. In some embodiments the tap can be identified by an accelerometer in the assistant device detecting a physical movement. In some embodiments the tap can be identified by resistive touch screen technology, capacitive screen technology, or frustrated total internal reflection technology.

Figure 2:
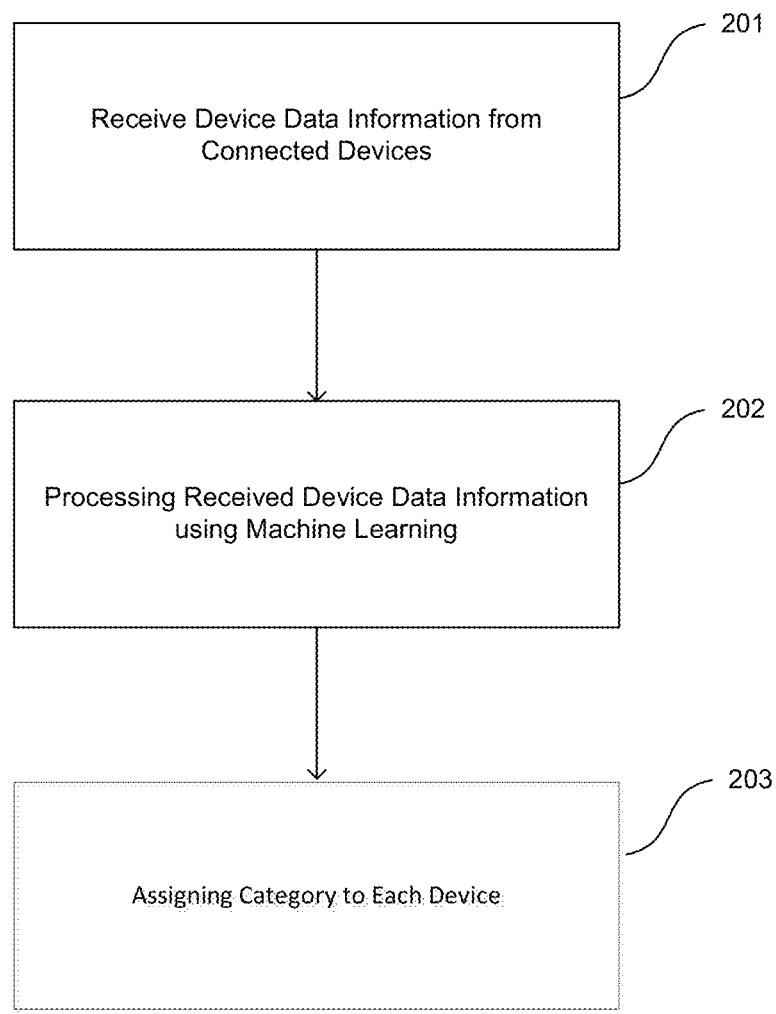
FIG. 2 illustrates an embodiment of determining device categories.

FIG. 2 illustrates an embodiment of determining device categories. The devices can collect and/or generate a lot of data. The device data can include and/or be used to derive contextual data. Device data can include user commands to the assistant device such as "please dim living room lights when a television is turned on." In an example, the assistant device can store the request by the user to have the television turned on. The user requests and interactions with devices can be stored as device data information. In at least one embodiment, the assistant devices store only information collected from the devices such as a request to have the lights turned on. In at least one embodiment, device data can include one or more of sensor data, user manual command, user verbal command, user gesture command, settings data, status data, environmental data, and/or other data collected by the device and/or assistant device.

In at least one embodiment, the device data information is collected as demonstrated at step 201, and category information is derived using a machine learning algorithm 202. Categories can be based on derived facets, features, contextual information, relationship information and/or semantic information. The machine learning algorithm can include one or more of decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems, supervised learning, unsupervised learning, semi-supervised learning, clustering algorithm, and/or classification algorithm.

For example, collected device data of a thermostat can include the temperature change requests and timestamps, and collected device data from the television can include timestamps of when the device was used. The machine learning algorithm can analyze the collected device data to determine patterns. Patterns can include correlations between collected device data; for example, it can be determined that the temperature on the thermostat is always raised when the television is on. In an embodiment, the device data information can be used to determine that specific devices are in the same room or in different rooms. In an example, if a light device is always turned on when the refrigerator device is opened, it can be determined that the two devices are related. In another example, the device data information can be used to determine which devices are light devices.

The received data information can further be used to generate and/or assign categories. In at least one embodiment, the devices are categorized using device data information. The devices and/or the corresponding facets, features, contextual information, relationship information, and/or semantic information can be used to determine categories of devices 203. For example, all devices which control lights can be categorized as "lighting devices," and all devices which are determined to be in the master bedroom can be grouped as "master bedroom devices." In at least one embodiment, the devices can be members of multiple categories. The categories of devices and/or the corresponding facets, features, contextual information, relationship information, and/or semantic information can be performed via a machine learning algorithm. The categories can include device location, activity type, and device categories.

For example, based on the use and context, it can be determined that both the thermostat and the television are located in the living room. It can also be determined that the thermostat and television are used all day on weekends but only in the evenings during the week. This information can be saved as a weekend or weekday evening activity type. In some embodiments, the assistant device can determine that the lights in the kitchen and the lights in the living room should be assigned to the illumination device category. In at least one embodiment, a user can manually enter, delete, and/or edit the categories and names of devices.

In at least one embodiment, the functionality information is collected for each device and is made available via the Home API. In at least one embodiment, the Home API includes a list of categories including device types and/or locations. Categories can include one or more of lights, home appliances, audio devices, wearable devices, user mobile devices, plant watering devices, televisions, and/or locks. Categories can include locations such as home, office, bedroom, master bedroom, living room, dining room, kitchen, and/or basement. Additionally, the device types and categories can include the respective functionalities such as "open" and "closed" functionalities of blinds, which can be associated with a window coverings category. When a device is connected to one or more assistant devices, it is associated with one or more categories. Therefore. a developer does not need to know the specific devices in the one or more homes but instead can indicate the rules and commands. For example, a developer can create a rule that when a certain button on an application is pressed, all devices that intersect the categories of the bedroom and light be switched to the functionality "off." The category, device, and/or functionality information can be made available to developers on the Home API. Therefore, the developer does not need to know the devices in the home but instead can rely on the categories which can, in the future, have devices assigned. For example, the developer does not need to know the exact devices which the user will install in the bedroom but instead can rely on the knowledge that devices will be connected and assigned to the bedroom category.

In at least one embodiment, the device data collected at 201 is collected from all devices that can potentially be connected to the home assistant. For example, when a new device is introduced to the market (e.g., a new device is launched by a company, etc.) the device data is collected about the device, and one or more categories are assigned to the device. The device data can include data released by the device by the manufacturer and/or another party. The devices and the associated categories can be stored in a database. In at least one embodiment, the database is publically available. In at least one embodiment, the database is available to all developers of a Home API. In at least one embodiment, the devices are categorized for the environment such as a work environment, home environment, and car environment.

Figure 3:
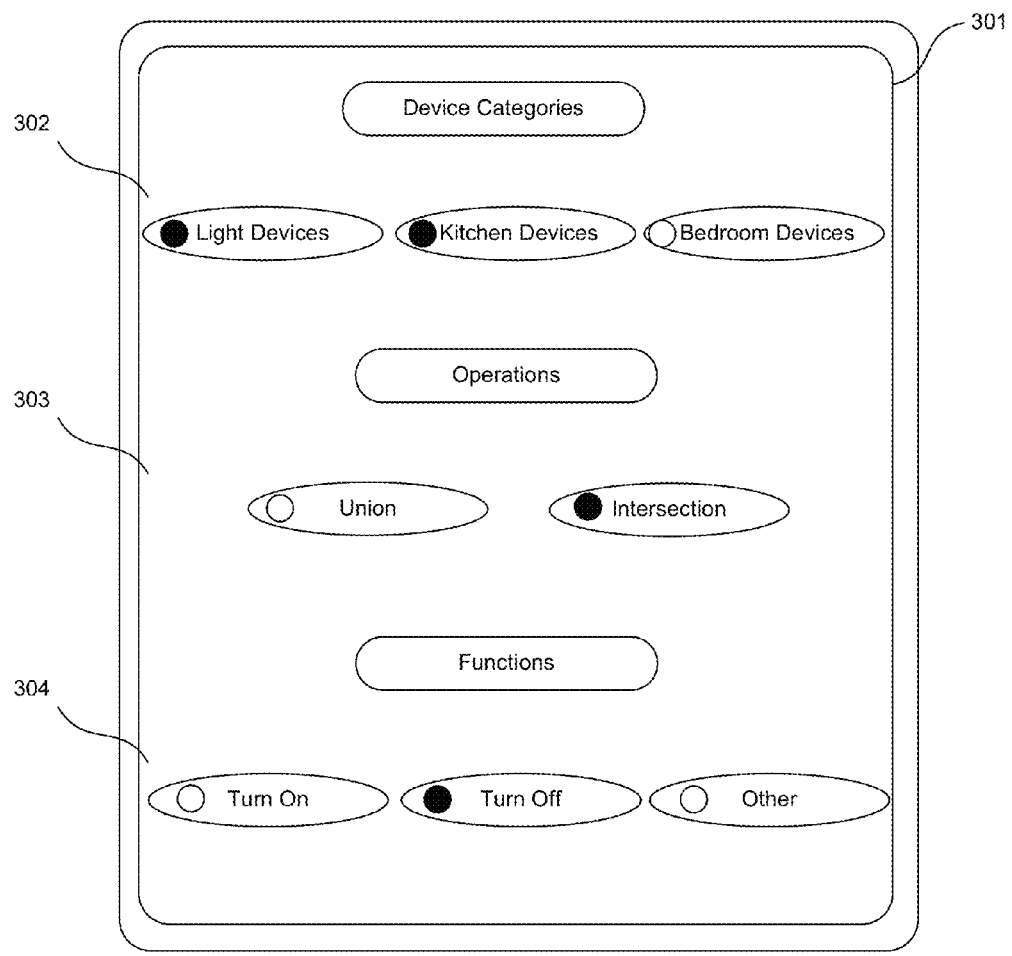
FIG. 3 illustrates an embodiment of a Home API graphic user interface (GUI)

FIG. 3 demonstrates an embodiment of a Home API graphic user interface (GUI). A developer can use the GUI 301 to create an app. The GUI can allow a developer to generate one or more graphics or import one or more graphics. The graphic can include a layout of graphical user interface elements for the application to instruct the assistant device to control one or more devices within the environment. The graphic can be generated by creating a background and/or elements.

The developer does not need to know the devices in a specific home environment and can select the devices' categories for identification. For example, a developer intending to create an application which turns all the lights off in the kitchen does not need to know the list of all devices that can be connected as lights in the kitchen, but instead can select the intersection 303 of categories 302, light devices and kitchen devices. The Home API GUI can also allow the developer to select the function 304 of the selected device categories. For example, the developer can select the function to turn off the devices that meet the criteria of intersection of light devices and kitchen devices.

The developer can configure applications without knowledge of the devices in the home environment. The developer can use categories to identify devices and the associated functions. Categories can include location categories such as kitchen, bedroom, master bedroom, bathroom, garage, child's bedroom, guest bedroom, dining room, etc. Categories can also include device categories such as lighting devices, cooking devices, entertainment devices, television devices, office devices, etc. The devices in the home environment that meet the criteria identified in the application by the developer can be controlled using the app. For example, although a developer of the application does not know which light device is in the user's kitchen, the developer can select kitchen and lighting device categories during the application development, and this will allow the application to control the functionalities of the kitchen light which is associated with the kitchen and light categories in the home environment. In at least one embodiment, the setup process of a device in the home includes identifying one or more device categories associated with the device. These categories can then be used to identify the devices.

Furthermore, functionalities 304 can be assigned to devices. Functionalities can include any functionality a device is capable of performing such as turn on, dim, turn off, make coffee, open, etc. The functionalities displayed on the Home API 301 screen can be dynamically adjusted depending on the device category selected. For example, when a coffeemaker device category is selected, the functionalities options can be adjusted to show functionalities of coffeemaker devices such as make coffee, grind coffee, turn off, keep warm, etc.

In at least one embodiment, the Home API allows the developer to create rules with two or more IoT devices. For example, the developer can create a rule having a condition of a specific wearable IoT device reporting over 10,000 daily steps, and that when a user device is within proximity of 10 feet from the home device, the condition will trigger the assistant device to play the song "Gonna Fly Now" via an IoT device speaker.

The rules can include services such as timer services, video monitoring services, audio monitoring services, signal monitoring services, news monitoring, conflict monitoring services, or a combination thereof. A selectable item can be configured to delay (using a timer service), when selected, the performance of the functionalities by the one or more devices until a specific time is identified on a timer. For example, a developer can program a selectable item called "start making coffee in 10 minutes" to cause the coffee maker to make coffee 10 minutes after the selectable item is selected by the user. The timer service also can allow the developer to create a selectable item, which when selected, causes the assistant device to cause a device to perform a functionality for a set time (e.g., 30 seconds, 5 minutes, 2 hours, etc.), and then cause the assistant device to send a request to the device to stop performing the functionality. For example, a developer can create a selectable item which when selected turns the lights on for only 15 minutes, and after the 15 minutes elapse, causes the lights to turn off.

The rule can also include a video monitoring service. A selectable item can be configured, when selected, to cause devices to perform a functionality until a specific video monitoring condition is met. For example, a developer can program the selectable item, when selected, to cause an air-conditioner to turn off until someone comes home. Selecting the selectable item having a rule associated with video monitoring can cause the video monitoring service to monitor the environment for the specified condition (e.g., a person coming into the environment, etc.), and then, when the condition is met, to perform a functionality. In some embodiments, the video monitoring and the timer services can be combined in a rule condition. For example, the selectable item can be programmed to monitor the video input for a specific period of time (e.g., 45 minutes, etc.).

The signal monitoring service can monitor for devices in the home (e.g., mobile device entering the home), changes of status of devices (e.g., television turned on, thermostat turned off, etc.), or status of devices (e.g., thermostat temperature reached 72 degrees, etc.). The news monitoring service can monitor the news such as the weather channel, current events, etc. The news monitoring service can monitor one or more news services for specific situations such as natural disasters (e.g., hurricanes, tornados, earthquakes, etc.), police activity (e.g., lockdown of a neighborhood), public service announcements (e.g., brownout warnings, etc.), and/or news events (e.g., brownouts, etc.). For example, a developer can configure a selectable item that can, when selected, turn on all the lights in the house unless a brownout warning is detected by the news monitoring service, in which case the functionalities associated with the selectable item are not be performed. In some embodiments, the developer can configure the warning to be displayed to user, and the user can select to ignore it and perform the functionalities associated with the selectable item.

The conflict monitoring service associated with a rule can monitor the status of all devices in the home and determine whether the rule being invoked causes a conflict with functionalities being performed in the environment, an operation in the home, and/or the settings of one or more devices. For example, a developer can create a rule associated with a selectable item which does not allow for the bathroom lights to be turned off when the shower is running. Thus when a selectable item "turn off all lights" is selected, the conflict monitoring service determine that the shower is on. In the instant example, the developer can configure the rule to perform the functionalities associated with some devices (e.g., turn off all lights except bathroom light) or can configure the rule to not implement any functionalities associated with the selectable item when a conflict is detected. In some embodiments, the developer can configure the rule to display the conflict to the user when the conflict is detected. In some embodiments, these services are implemented using microservices.

In at least one embodiment, each selected rule and/or functionality has a corresponding mechanism which allows the assistant device to provide functionalities such as providing instructions for connected devices. Mechanisms can include remote invocation, service registration, publication, and/or subscriptions. The mechanisms can have corresponding policies. The policies can be responsible for deciding how to address events such as network errors and services behaving erratically. In at least one embodiment, the Home API allows the developer to configure the mechanisms and/or policies.

Furthermore, the rules, functionalities, and/or services can implemented using microservices. Microservices can be addressable remote objects that encapsulate a state and expose a set of functionalities with their associated parameters that can optionally return parameters upon invocation. The microservices can communicate by fully asynchronous message passing. Microservices can be reactive or proactive. A reactive microservice waits for remote invocations to execute an action, and optionally returns some values. For example, a microservice associated with a rule requiring the lights to be turned on when an icon is pressed can be a reactive microservice.

A proactive microservice can handle remote invocations, but it can also execute functionality in the background (e.g., timer service, voice recognition, etc.). For example, a reactive microservice can be associated with a rule requiring the coffee maker device to keep the coffee warm for 15 minutes (e.g., timer service counts 15 minutes to turn off the coffee device, etc.). A voice recognition service can be a background service that proactively listens to the microphone and analyzes the audio. Microservices can be packaged as components associated with device adapters. In some embodiments, the system can be configured to perform the initiated functionality or rule when a microservice is not responsive. In some embodiments, the microservice is stateless. In an embodiment, the application can be configured not to fail when one or more microservices are unavailable.

Figure 4:
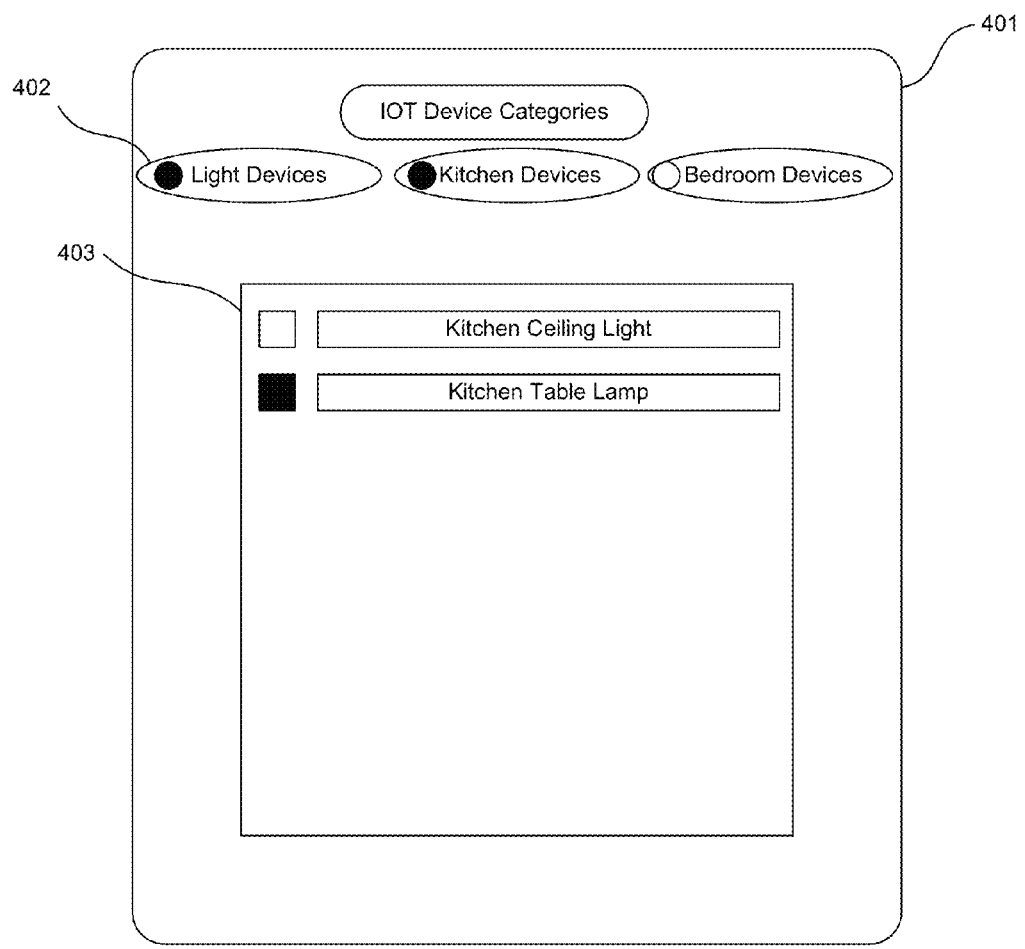
FIG. 4 illustrates an embodiment of a Personal Home API GUI.

FIG. 4 demonstrates an embodiment of the Personal Home API GUI. A Home API can be available to individuals looking to build applications to customize their homes. In at least one embodiment, an owner of an assistant device can build an application using the Personal Home API GUI 401 in her home environment. The developer (e.g., owner) can use the Personal Home API to view available devices 403 such as kitchen ceiling light and kitchen table lamp. The developer can generate applications and customize the home environment. In at least one embodiment, the developer can narrow down the list of available devices by selecting a category 402.

A developer can select a view type such as the device categories 402 (e.g., device location, device function type, etc.). In the demonstrated example, the lighting device and the kitchen device categories are selected, and all the devices that meet the criteria are displayed; see element 403. Once the element is displayed, the developer can select the device. In at least one embodiment, after selecting a device, the developer is given an option to select the available set of functions of the device. For example, after selecting kitchen table lamp, the developer can be prompted to select the function of the kitchen table lamp such as "lights on." The developer can select the function and/or device and associate it with a button and/or command on a screen.

In at least one embodiment, the Home API can allow the user to set up rules and/or conditions. The developer can select and/or enter conditional statements such as if, then, when, where, and equal. In at least one embodiment, the developer can configure rules using Boolean operators such as and, or, and not. For example, the developer can create a rule that when specific conditions are met (e.g., all lights are on, etc.) a device should perform a function (e.g., smart curtains closed, etc.). The rules can be created by a developer selecting devices, functions, operators and/or statements from a menu on a graphical user interface. The rules can be set to automatically perform a specific task when a condition is met. In at least one embodiment, the rules can be created by the developer writing code.

In at least one embodiment, the Home API allows the developer to create rules with two or more IoT devices. For example, the developer can create a rule having a condition of a specific wearable device reporting over 10,000 daily steps, and when a user device is within a proximity of 10 feet from the home device, the condition will trigger the assistant device to play the song "Gonna Fly Now" via a device speaker. In some embodiments, the rules are automatically generated based on the selected functionality and/or device category.

Rules can be automatically generated using a rule definition database having information about device, device locations, device types, functionalities, and associated attributes. The attribute information in the rules definition database can include attribute information about which devices, device locations, device types, and functionalities conflict. Attribute information can indicate whether the devices and/or locations are security related (e.g., locks, etc.), potentially dangerous (e.g., can cause fire, etc.), incompatible (e.g., devices or functionalities that should not be used at the same, etc.), and/or time sensitive (e.g., used only between certain hours, used only for a set period of time, etc.).

The attribute information can determine the selectable item rules generated. An attribute associated with thermostat devices can specify that all thermostat devices in the environment should be set to similar temperature. For example a conflicting functionality can be setting a high temperature on one thermostat and setting the air-conditioner on a second thermostat in the same room. Other attribute information can exist about devices and functionalities, for example, the devices associated with security can require authentication. In some embodiments, only the "unlock" functionality of a security device can require authentication. For example, when a developer generates a selectable item "unlock lock" with the device type "lock" and functionality "unlock," a rule can automatically be generated requiring authentication. The rule can require that the video monitoring service is initiated in response to the "unlock lock" selectable item being selected, and the video monitoring service can determine whether the individual selecting the item is a primary user and/or member of the primary user group associated with the home. In some embodiments the video monitoring service can be configured to monitor the use of the "unlock lock" selectable item and report any unusual activity to the police or all primary users of the assistant device. Unusual activity can include recognizing a weapon in the video input. Locations can indicate attributes requiring privacy; rules also can be assigned based on the location associated with the devices. For example, a rule related to a bathroom location can prohibit the use of video devices. Thus, when a developer assigns a selectable item a functionality of turning on all cameras in the environment, a rule can automatically be generated preventing the video devices in the home with a bathroom location from turning on in response to the selection of the selectable item. A rule associated with the "unlock lock" selectable item can include a signal monitoring service which determines a user's proximity to the location of the device. Signal monitoring services can determine that a user's device is too far away from the location of the device and can prevent the functionality from being implemented. For example, the user may be prevented from unlocking the lock when, based on the distance determined by the signal monitoring service, the user's device is more than a threshold distance away from the location. In an example, when the user's device is determined using the signal monitoring service not to be in the environment, then the rule may be set to prevent the user from turning on appliances such as the coffee maker. In some embodiments, the threshold distance of the user's device to the environment must be met to allow the selectable item of the application on the user's device to operate one or more associated devices.

Figure 5:
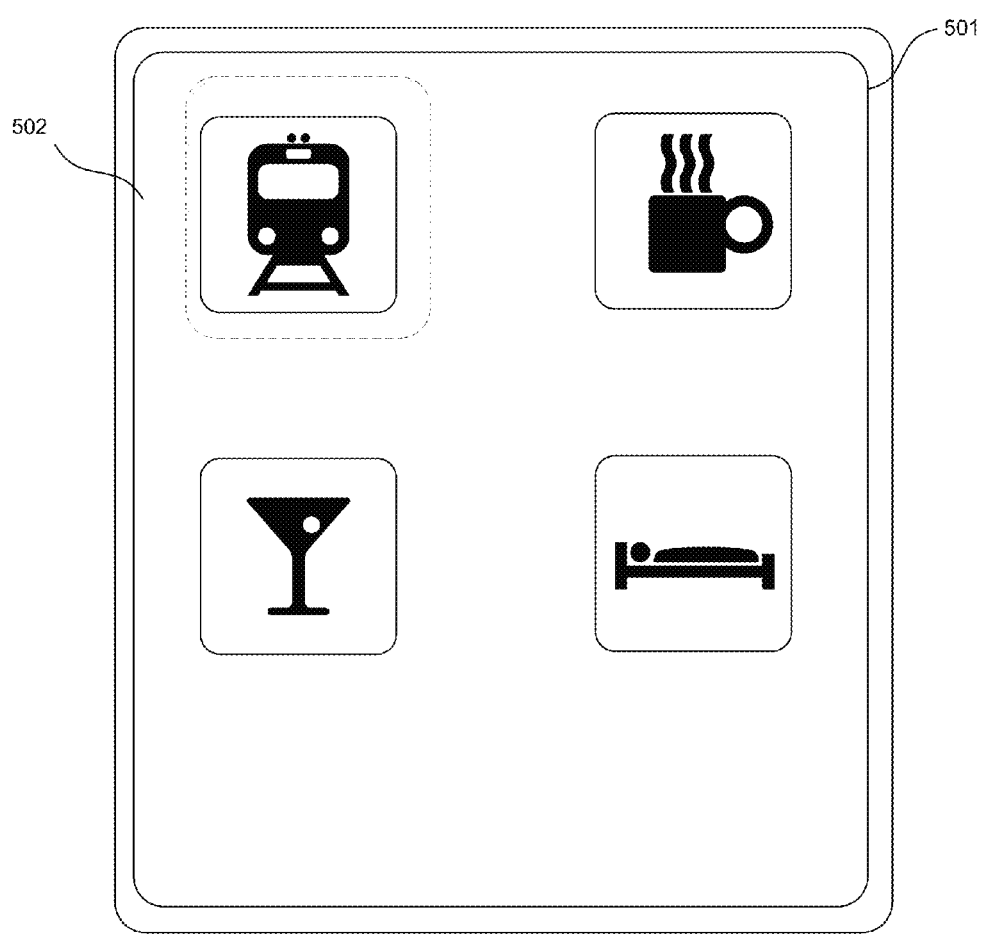
FIG. 5 illustrates an embodiment of an application development screen.

FIG. 5 illustrates an embodiment of an application development screen of the Home API. In at least one embodiment, the developer loads a graphic 501, selects a button on the graphic 502, and via the Home API interface selects corresponding functionality of one or more devices. For example, a developer can load a graphic 501, select a transport icon 502 on the graphic, then assign functionalities and/or rules. The area selected can then be set to perform the functionalities and/or rules when clicked by the user. For example, the transport icon can be configured to cause the assistant device to turn on the television devices to the traffic news channel. In another example, the transport icon can be configured to cause the assistant device to provide a traffic report.

In at least one embodiment, the Home API allows the developer to build the graphic screen using the Home API GUI. The Home API can include a feature of automatic programming and can be used to generate programming code based on the selected rules. In an example, the graphic 501 can be built using the Home API GUI.

In at least one embodiment, machine learning can be used to identify sections of a graphic intended to operate as selectable items (e.g., buttons). The graphic represents a layout having one or more graphical interface elements (GUI). The graphic can be analyzed to determine the potential selectable items by one or more of detecting edges, changes in color between the background of the graphic and the portion of the graphic that corresponds to the selectable item, identifying the shapes, or identifying a pattern change. In an embodiment, the section can be identified based on a change in color between a background color of the graphic and a color of the section of the graphic. In an example, a button can be identified by determining that the graphic has an item which is a square shape. In another example, a button can be identified in a graphic by determining the graphic has a color different from the color primarily used in the graphic. The selectable item can be determined by determining an interruption of pattern in the graphic. For example, for a graphic with a striped pattern having portions that are not striped, the determination algorithm can identify the not striped portions and determine those portions to be selectable items. In at least one embodiment, determining a potentially selectable item can be done by one or more of an interpretation tree, geometric hashing algorithm, speech up robust features algorithm, pose clustering, object recognition algorithm, or another algorithm.

The Home API can also identify objects of the graphical content in the graphic. The objects can be identified using pattern recognition, machine learning, data mining, or knowledge discovery. The graphic can be analyzed to determine the objects depicted. For example, a graphic having a picture of a train can be analyzed, and it can be determined that the graphic depicts a train. In an example where a train and a bed are depicted in the graphic, the Home API can identify the two objects (train and bed). In at least one embodiment, the objects can be determined to be selectable items.

In at least one embodiment, the Home API identifies the selectable items first then identifies the objects within the selectable items (e.g., buttons). For example, a graphic which has two squares, the first square with a picture of a train and the second square with a picture of the bed, can be analyzed to determine that the squares are selectable items, and then it can be determined that the object train is in the first square and the object bed is in the second square. In at least one embodiment, the Home API identifies the selectable items and the objects simultaneously, in parallel, and/or identifies the objects before identifying selectable items. The objects can be determined to be associated with a functionality and/or device by analyzing a position of the graphical content within the section, a size of the graphical content in relation a size of the section, a relationship between the position of the graphical content with other graphical content within the section, a color of the graphical content, or the color of the section of the graphic.

The Home API can also identify the text depicted on the graphic. For example, the Home API can determine that a graphic has the words "Open" "Home," or "Exit." It can be determined that the identified words represent a selectable item. In at least one embodiment, this determination can be made by referring to a database of words having words which are selectable items. In at least one embodiment, the characteristics of the text can be used to determine information about the text and/or the selectable items. Characteristics of the textual content including one or more of a meaning of the textual content, a size of the textual content, a font of the textual content, a relationship between a position of the textual content and the position of the graphical content, or the position of the textual content within the section.

In one embodiment, it can be determined whether the text is a selectable item based on context derived. For example, the words of the text "I better start planning my menu for Thanksgiving dinner" can be analyzed, and it can be determined that the text "menu" is unlikely to represent a selectable item because of the relationship to other words in the textual content. The text of a selectable item can be analyzed to determine the functionalities and/or related devices. The analysis can consider the size of the text, for example larger text can be determined to be more relevant and have a higher weight than smaller text in determining the associated functionalities and/or devices. The position of the text can be analyzed to determine the font, and the font can be considered when determining the associated functionalities and/or devices. Certain fonts can be determined to be associated with specific functionalities. For example, the Times New Roman or Georgia fonts can be determined to be fonts which give the text higher relevance. Thus, a selectable item that includes the text "click here to turn off lights" where the "turn off lights" is in a Times New Roman font and the "click here" is in a different font, it can be determined that the "turn off lights" is the more relevant text. The size of the font can also be considered in determining information about the text.

In at least one embodiment, the Home API can identify the text on a graphic. The text can be analyzed to determine potential associated functionality and/or associated one or more devices. In some embodiments, the meaning or context of the text can be derived, for example, the meaning or context can include a dictionary meaning, a brand, a device, a functionality, etc. The meaning can also include an associated relevance level, for example, it can be determined whether the level of relevance the meaning has in determining the functionality, device type, or a device associated with the selectable item. In one embodiment, the text identified within a selectable item can be used to determine the associated functionality and/or associated one or more devices. In some embodiments, the text identified on the graphic but not within the selectable items can be used to determine associated functionality and/or associated one or more devices for the selectable items. In some embodiments, the objects identified on the graphic can be used to determine the functionality and/or one or more devices for the selectable items.

A graphic with a square with the word "menu" and food objects outside the boundaries of the square (e.g., apple, banana, potato, chicken, etc.) can be analyzed to identify the square as a selectable item, the word "menu" can be recognized, and it can be determined that the selectable item is related to that word "menu." The food objects can be identified and used to provide context for the "menu" selectable item. A machine learning algorithm can be used to determine that the "menu" selectable item is food-related. The machine learning algorithm can use the food objects to classify the selectable item and identify the associated functionality and/or device category. In at least one embodiment, the Home API can allow the developer to correct wrong determinations. The machine learning algorithm can be set to learn from the developer corrections.

In at least on embodiment, the Home API has access to a database storing information about selectable items and the associated functionalities and/or device categories. For example, the database can include a record of train-related selectable items and store the associated functionality of providing transit information. In another example, the database can store a record of light-related selectable items, the associated functionality of "on" and the associated device category of lights.

The Home API can identify the selectable items and provide a developer with a screen allowing the developer to configure the functionalities and/or devices of the selectable items; see FIGS. 3-4. In at least one embodiment, the Home API automatically configures the selectable items with the determined functionalities, associated device categories, and/or device. The Home API can automatically generate the code necessary to allow the selectable items to cause the assistant device to transmit commands to determined functionalities, associated device categories, and/or devices. In at least one embodiment, the Home API can access a database of adapters associated with the determined functionalities, associated device categories, and/or devices.

In an example, a graphic can have a brand (company name) listed on the layout, a square with the word "on" and a picture of a light bulb. The characteristics of the graphic can be analyzed to determine that includes a square, and the square can further be identified as being a selectable item. It can further be determined that the graphic content includes text representing a brand. The position on the graphic in relation to other content, relations to other content, color, font, size, and definition can be used to determine that the text is a brand. For example, the definition can be used to determine that one of the meanings of the word is a trademark, and then the color, size and font of the text can be analyzed to determine how closely the text matches the trademark. The relationship to the light bulb depiction can also be identified; for example, if the brand is on the light bulb, it can be determined that the brand represents the brand of the light bulb. If the light bulb is far from the text it can be determined that likely the text does not describe the brand of light bulb. Additionally, the size of the text can aid in determining the relationship; for example, if the text of the brand is very large, then it can be determined that the brand represents all the devices which are to be associated with the selectable items. Likewise, if the large text was "Kitchen," it can be determined that all or most selectable items on the graphic are related to the kitchen.

The text "on" can also be used to determine the functionality associated with the selectable item. The text can be analyzed to determine the position in proximity to the light bulb depiction and the position on the selectable item. The size and the font can also be used to determine the functionality and/or associated device. For example, if the font is large, then it is likely that the functionality associated with the selectable item is "on." The other nearby text can also be considered. For example, if the text in the selectable item next to the "on" text is "off," then it can be determined that the functionality is both on and off. Alternatively, depending on the size of the text, it can be determined that the "on" and "off" text has little relevance to the associated functionality to the selectable item.

The depiction of the light bulb object can also be analyzed to determine the functionality, device type, and/or device. The light bulb depiction can be analyzed and determined to be associated with a lighting device and/or device category. The characteristics of the object can be analyzed. The proximity of the object to the text and/or other depicted objects, the size of the object, the size of the object in relation to the objects, the color, or positioning to the selectable item can be used to understand the intended functionalities and/or devices associated with the selectable item. The object can also be determined to be associated with an object type. Object types can include descriptions and categories of objects, for example, food, lights, curtains, kitchen, office, television, speakers, etc. Each object type can be associated with a device type such as lighting devices, kitchen devices, office devices, etc.

The characteristics of the object can be used to determine the relevance of the object and can help determine the intended functionality and/or device. The determination algorithm can factor the relevance and/or weight of the information it collects to determine the intention. A large light bulb object taking up most of the space in the selectable item can be determined to have a high likelihood of the selectable button being related to a light device. Alternatively, a very small light bulb surrounded by other objects all within the borders of the selectable device can be determined to have little relevance to determining the functionalities and/or devices associated with the selectable item.

In the example, based on the size of the light bulb, the "on" text and the brand name, the algorithm can determine that the functionality and devices associated with the selectable button are turning on lighting devices. It can be further determined that the lighting devices associated with the selectable item are of a specific brand. In an example, these functionalities and devices can automatically be assigned to the selectable item of the graphic. Thus, when a user uses the application having the graphic, the user will need to select the selectable item, and the device will turn on the lights of the specific brand in the user's environment.

In another example, a graphic having a square with the word "on" and a picture of a light bulb can be automatically assigned the square as a selectable item with the functionality of "on" in association with the light category. Thus, when a user uses the application having this graphic, the user will select the selectable item, thereby causing the devices in the home having the light category to turn on.

In some embodiments, the color of the depicted object can be used to determine the functionality and/or the device. For example, a depiction of a light bulb that is black in color can be determined to represent a functionality of "off," while a white light bulb can be determined to represent the functionality of "on." In some embodiments the relevance of the color of the depicted object can be identified by identifying the colors of other depicted objects in the same or other selectable items. For example, if all depicted objects on the graphic are black, then the black coloring of the light bulb can be determined to not be relevant.

In some embodiments, the graphic can have associated metadata which can be used to identify selectable text and/or the associated functionalities and/or devices. In at least one embodiment, the developer can configure the application being created via the Home API to collect information. The Home API can allow the developer to collect information about the devices in its proximity and to control the functions of only those devices. The Home API can present the developer with information, which can be collected via a user device, which will run the corresponding app. Information such as GPS location, device proximity information, and/or assistant device proximity can be collected. The developer can create rules associated with the gathered information via a user device and functionalities of devices and/or assistant devices. For example, the developer can select that when the condition of the user device being within the proximity of 10 feet from the Home API is met, the living room lights are turned on.

As demonstrated by FIG. 3, the Home API presents high-level commands in a natural and intuitive format. The Home API developer is not required to understand the nuances of the Ambient OS. The developer simply needs to select high-level commands, mechanisms, policies, contexts, environment models, and/or components (e.g., microservices, etc.). The Home API can generate the necessary code which allows it to communicate with the assistant device and/or the devices.

The Ambient OS can include subsystems such as a service registry, a component manager, an event bus, or a user manager. The service registry can further allow the Home API to register and browse microservices. The component manager can be responsible for validating, installing, uninstalling, and browsing components, as well as providing the runtime environment to instantiate these components. In at least one embodiment, a component can be a package that includes resources that can be deployed into Ambient OS. In an embodiment, the event bus can implement communication channels. A user manager can be configured to provide functionality to create, browse, edit, and remove users. The Ambient OS can be configured to be transport agnostic and rely on Gateways to implement the underlying protocols to communicate with the system. Microservices can be decoupled from the transport so the same code works with different protocols. Ambient OS provides the following gateways.

The Ambient OS can further include WebSocketGateways, HTTPGateway, CloudWebSocketGateway, and entity registry. The Service Registry can maintain a list of running microservices. The WebSocketGateway: can reply on WebSockets as the communication protocol among components. The HTTPGateway can be configured to serve WebApps that leverage Ambient OS microservices and expose an HTML-based GUI to users. For example, a WebApp timer can display an HTML page with a counter. This HTML page can interact with a timer service to set the countdown time as well as start and stop the timer. Furthermore, the page can listen to a channel to get a notification from the timer service when time is up and update the universal interface accordingly/

In at least one embodiment, an administrative console permits the configuration of the Home API. The administrative console can be used to create user accounts and maintain the types of services that the developers can access. For example, the administrative console can be used to set up permissions for developers. For instance, the super developers can be allowed access to all microservices while other developers can only be configured to have access to specific microservices and/or tools.

Figure 6:
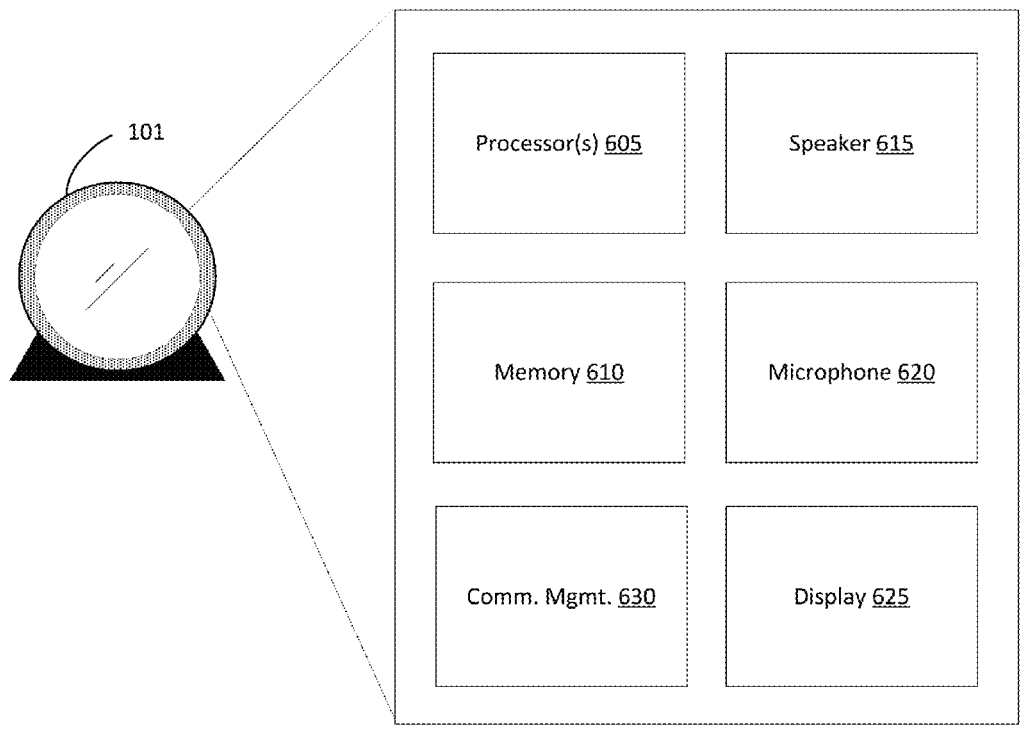
FIG. 6 illustrates an example of an assistant device.
Figure 7A:
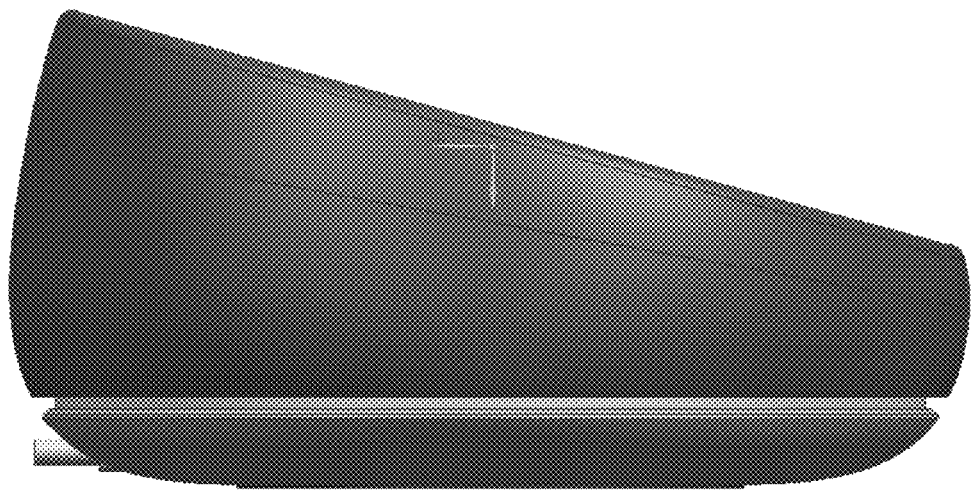
FIGS. 7a-7l illustrate embodiments of an assistant device.
Figure 7B:
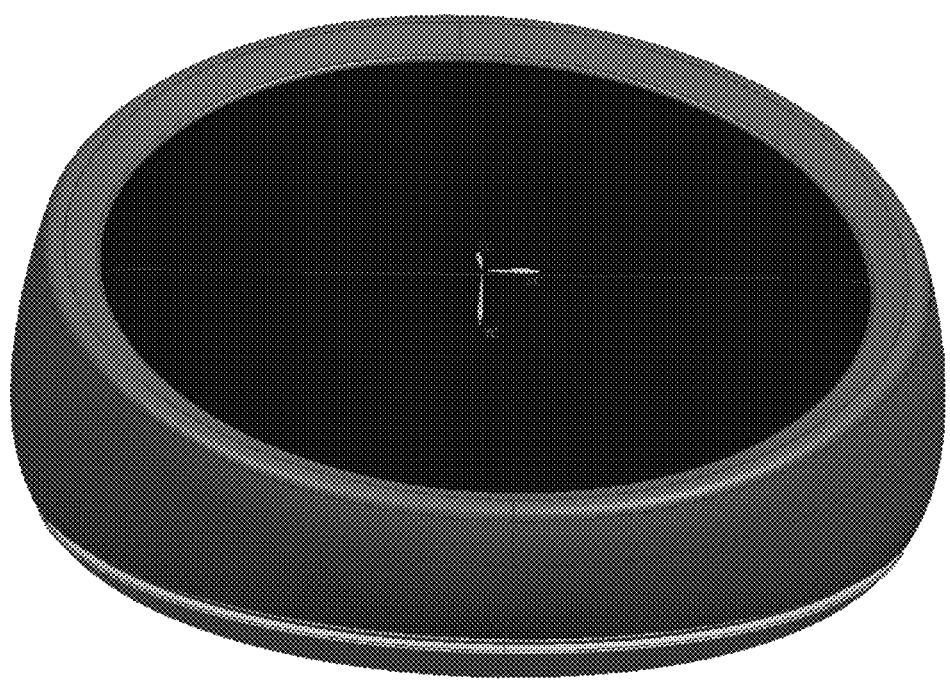
Figure 7C:
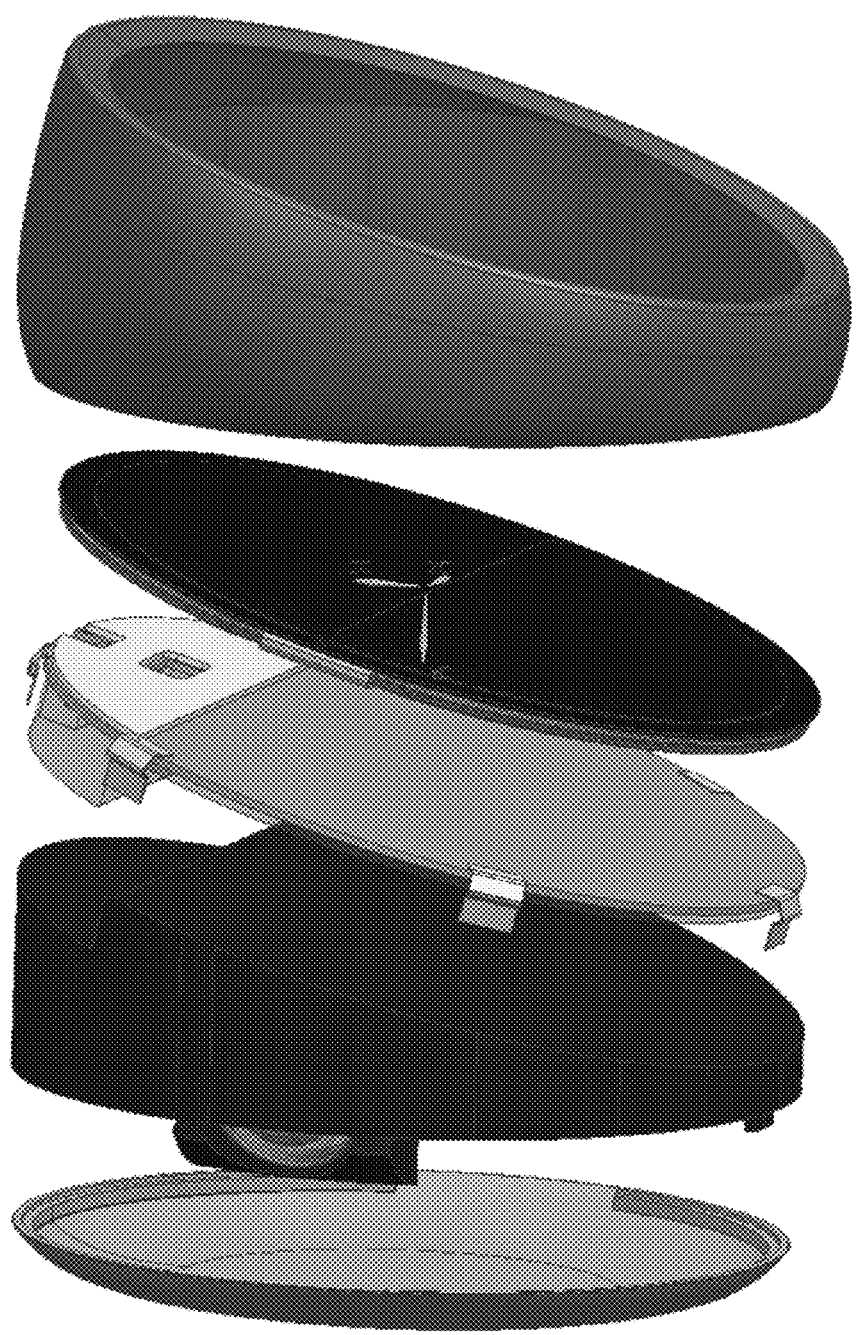
Figure 7D:
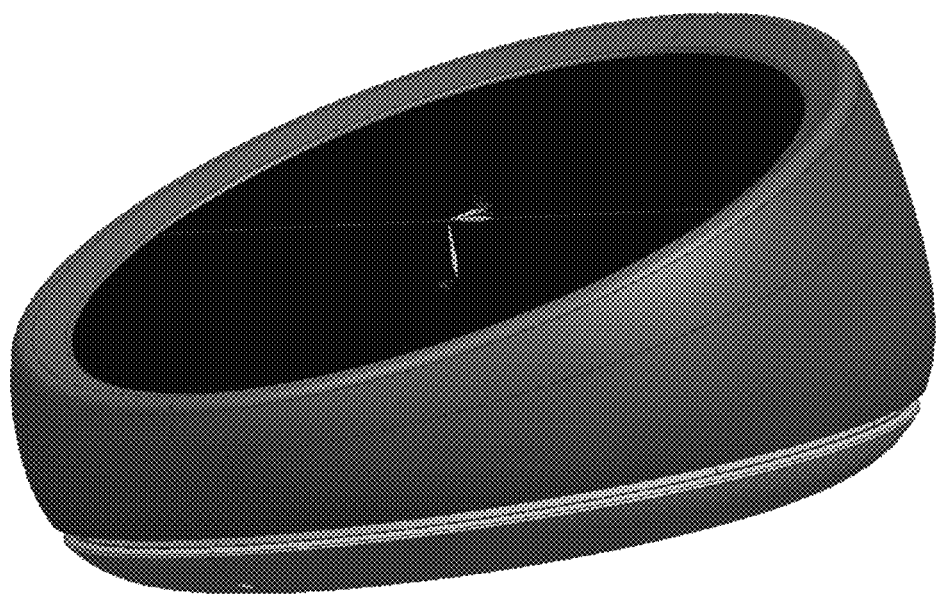
Figure 7E:
Figure 7F:
Figure 7G:
Figure 7H:
Figure 7I:
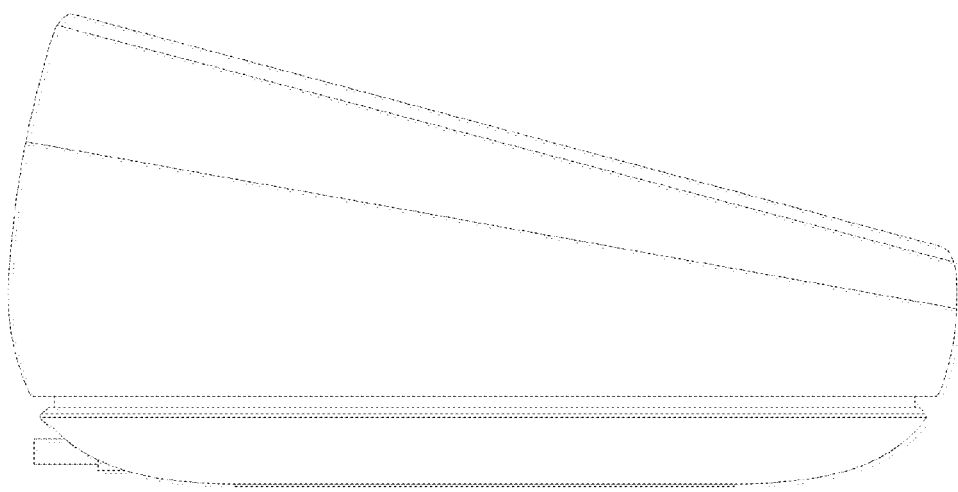
Figure 7J:
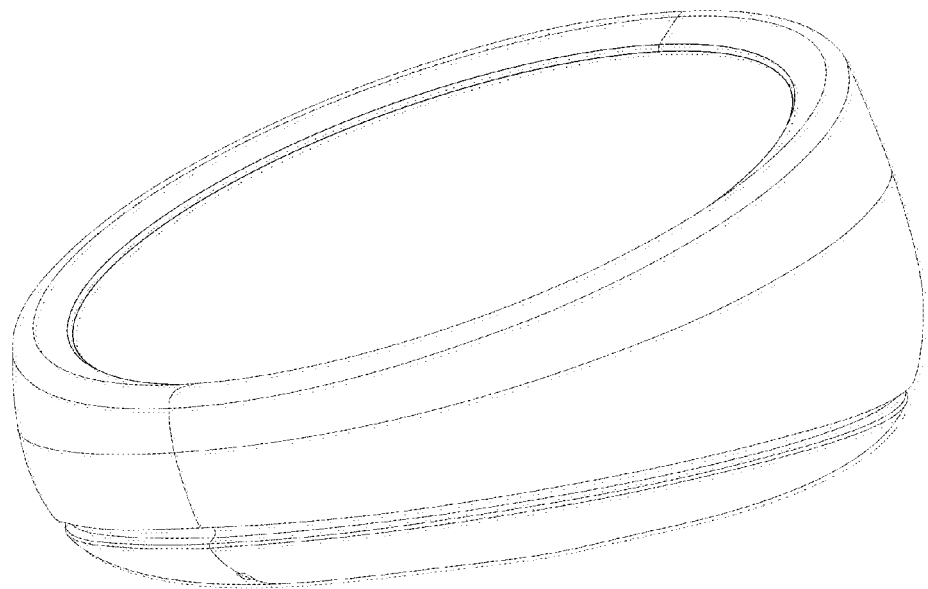
Figure 7K:
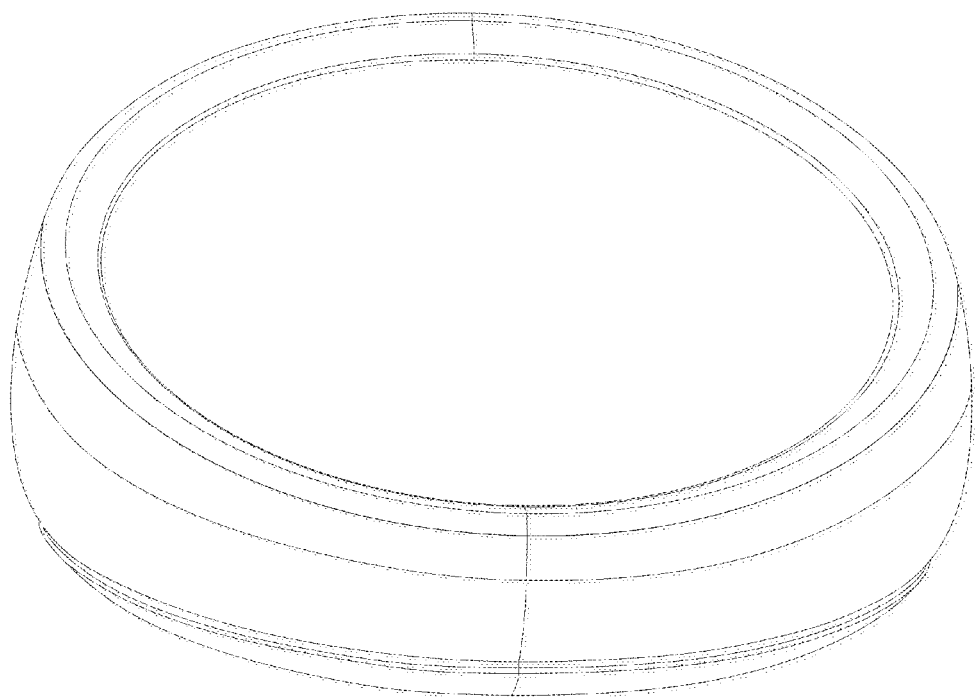
Figure 7L:
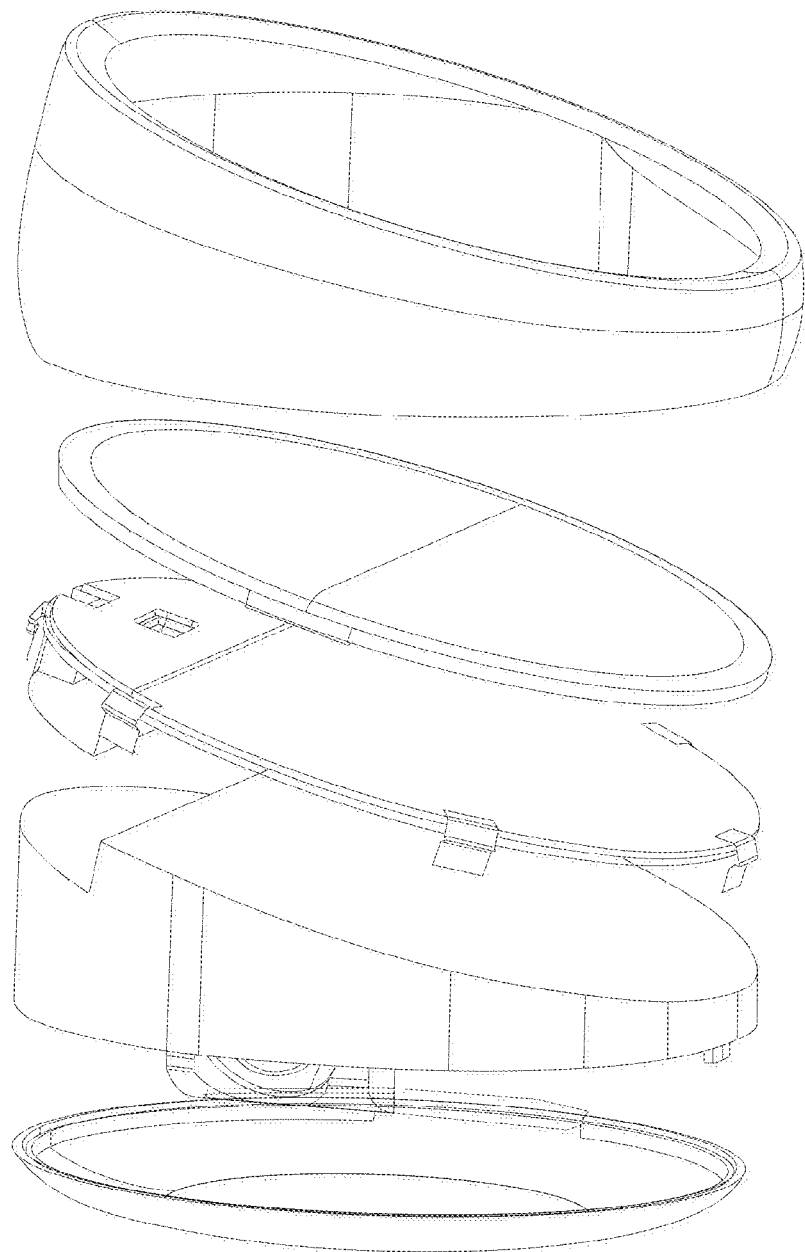

FIG. 6 illustrates an example of an assistant device. In FIG. 6, assistant device 101 includes a processor 605, memory 610, touchscreen display 625, speaker 615, microphone 635, as well as other types of hardware such as non-volatile memory, an interface device, camera, radios, etc. to implement communication management logic 630 providing the techniques disclosed herein. Various common components (e.g., cache memory) are omitted for illustrative simplicity. The assistant device is intended to illustrate a hardware device on which any of the components described in the example of FIGS. 1-5 (and any other components described in this specification) can be implemented. The components of the assistant device can be coupled together via a bus or through some other known or convenient device.

The processor 605 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 605 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM) such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible.

Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

FIGS. 7a-7l illustrate embodiments of the assistant device. Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for seamlessly and automatically building an application using an application programming interface (API) to interface with one or more devices within an environment with an assistant device having artificial intelligence (AI), comprising:
generating, by a processor, a graphic representing a layout of one or more graphical user interface (GUI) elements for the application to instruct the assistant device to control the one or more devices within the environment;
selecting, by the processor, a section of the graphic corresponding to the one or more GUI elements for the application that is to be a selectable item on the application to implement a functionality to be performed within the environment using the assistant device;
assigning, by the processor, one or more device categories to the section of the graphic corresponding to the one or more GUI elements for the application that is to be the selectable item on the application to implement the functionality to be performed within the environment using the assistant device, wherein the one or more device categories indicate types of devices within a location that can perform the functionality within the environment using the assistant device;
generating, by the processor, a rule based on attributes associated with the one or more device categories indicating the types of devices within the location that can perform the functionality within the environment using the assistant device, wherein the rule indicates a timer service and a conflict monitoring service to be executed, wherein the timer service initiates a count of time from selection of the section of the graphic corresponding to the one or more GUI elements for the application to determine when the count of time reaches a threshold time causing the one or more devices associated with the one or more device categories to perform the functionality within the environment using the assistant device, wherein the conflict monitoring service determines that the environment includes a conflicting device having a status that is not compatible with the functionality within the environment, and wherein the conflict monitoring service terminates performance of the functionality within the environment when the status of the conflicting device is determined; and
generating, by the processor, the application having the section of the graphic corresponding to the one or more GUI elements for the application, wherein the section of the graphic corresponding to the one or more GUI elements for the application when selected instructs the assistant device to cause the one or more devices to perform the functionality within the environment in accordance with the rule.

2. A method, comprising:
generating, by a processor, a graphic representing a layout of one or more graphical user interface (GUI) elements for an application to instruct an assistant device to control one or more devices within an environment;
selecting, by the processor, a section of the graphic corresponding to the one or more GUI elements for the application that is to be a selectable item on the application to implement a functionality to be performed within the environment using the assistant device;
assigning, by the processor, one or more device categories to the section of the graphic corresponding to the one or more GUI elements for the application that is to be the selectable item on the application to implement the functionality to be performed within the environment using the assistant device, wherein the one or more device categories indicate types of devices within a location that can perform the functionality within the environment using the assistant device;
generating, by the processor, a rule based on attributes associated with the one or more device categories indicating the types of devices within the location that can perform the functionality within the environment using the assistant device; and
generating, by the processor, the application having the section of the graphic corresponding to the one or more GUI elements for the application, wherein the section of the graphic corresponding to the one or more GUI elements for the application when selected instructs the assistant device to cause the one or more devices to perform the functionality within the environment in accordance with the rule.

3. The method of claim 2, wherein the rule includes a timer service.

4. The method of claim 3, wherein the timer service initiates a count of time from selection of the section of the graphic corresponding to the one or more GUI elements for the application to determine when the count of time reaches a threshold time causing the one or more devices associated with the one or more device categories to perform the functionality within the environment using the assistant device.

5. The method of claim 2, wherein the rule includes a conflict monitoring service, and wherein the conflict monitoring service determines that the environment includes a conflicting device having a status that is not compatible with the functionality within the environment.

6. The method of claim 5, wherein the conflict monitoring service terminates performance of the functionality within the environment when the status of the conflicting device is determined.

7. The method of claim 2, wherein the one or more device categories include the location, wherein the rule is generated based on the location, and wherein the rule includes a signal monitoring service.

8. The method of claim 7, wherein the signal monitoring service determines a distance of a user's device to the location.

9. The method of claim 8, wherein when the distance is determined to be within a threshold distance causing the one or more devices associated with the one or more device categories to perform the functionality within the environment.

10. The method of claim 2, wherein the one or more device categories include a security category, and wherein the rule includes a video monitoring service.

11. The method of claim 10, wherein when the video monitoring service determines that a user selecting the section of the graphic corresponding to the one or more GUI elements for the application is a primary user of the assistant device, the one or more devices associated with the one or more device categories perform the functionality within the environment.

12. The method of claim 2, wherein generating the graphic includes creating a background and elements.

13. An electronic device, comprising:
one or more processors;
a database storing records including information regarding one or more devices in an environment; and
a memory storing instructions, execution of which by the one or more processors cause the electronic device to:
generate a graphic representing a layout of one or more graphical user interface (GUI) elements for an application to instruct an assistant device to control one or more devices within the environment;
select a section of the graphic corresponding to the one or more GUI elements for the application that is to be a selectable item on the application to implement a functionality to be performed within the environment using the assistant device;
assign one or more device categories to the section of the graphic corresponding to the one or more GUI elements for the application that is to be the selectable item on the application to implement the functionality to be performed within the environment using the assistant device, wherein the one or more device categories indicate types of devices within a location that can perform the functionality within the environment using the assistant device;
generate a rule based on attributes associated with the one or more device categories indicated by the information regarding the one or more devices in the environment found in the database, wherein the one or more device categories indicate the types of devices within the location that can perform the functionality within the environment using the assistant device; and
generate the application having the section of the graphic corresponding to the one or more GUI elements for the application, wherein the section of the graphic corresponding to the one or more GUI elements for the application when selected instructs the assistant device to cause the one or more devices to perform the functionality within the environment in accordance with the rule.

14. The electronic device of claim 13, wherein the rule includes a timer service.

15. The electronic device of claim 14, wherein the timer service initiates a count of time from selection of the section of the graphic corresponding to the one or more GUI elements for the application to determine when the count of time reaches a threshold time causing the one or more devices associated with the one or more device categories to perform the functionality within the environment using the assistant device.

16. The electronic device of claim 13, wherein the rule includes a conflict monitoring service, and wherein the conflict monitoring service determines that the environment includes a conflicting device having a status that is not compatible with the functionality within the environment.

17. The electronic device of claim 16, wherein the conflict monitoring service terminates performance of the functionality within the environment when the status of the conflicting device is determined.

18. The electronic device of claim 13, wherein the one or more device categories include the location, wherein the rule is generated based on attributes associated with the location, and wherein the rule includes a signal monitoring service.

19. The electronic device of claim 18, wherein the signal monitoring service determines a distance of a user's device to the location.

20. The electronic device of claim 19, wherein when the distance is determined to be within a threshold distance causing the one or more devices associated with the one or more device categories to perform the functionality within the environment.

21. The electronic device of claim 13, wherein the one or more device categories include a security category, and wherein the rule includes a video monitoring service.

22. The electronic device of claim 21, wherein when the video monitoring service determines that a user selecting the section of the graphic corresponding to the one or more GUI elements for the application is a primary user of the assistant device, the one or more devices associated with the one or more device categories perform the functionality within the environment.

23. The electronic device of claim 13, wherein generating the graphic includes creating a background and elements.

24. A computer program product, comprising one or more non-transitory computer-readable media having computer program instructions stored therein, the computer program instructions being configured such that, when executed by one or more computing devices, the computer program instructions cause the one or more computing devices to:
generate a graphic representing a layout of one or more graphical user interface (GUI) elements for an application to instruct an assistant device to control one or more devices within an environment;
select a section of the graphic corresponding to the one or more GUI elements for the application that is to be a selectable item on the application to implement a functionality to be performed within the environment using the assistant device;
assign one or more device categories to the section of the graphic corresponding to the one or more GUI elements for the application that is to be the selectable item on the application to implement the functionality to be performed within the environment using the assistant device, wherein the one or more device categories indicate types of devices within a location that can perform the functionality within the environment using the assistant device;
generate a rule based on attributes associated with the one or more device categories indicated by information regarding the one or more devices in the environment found in a database, wherein the one or more device categories indicate the types of devices within the location that can perform the functionality within the environment using the assistant device; and
generate the application having the section of the graphic corresponding to the one or more GUI elements for the application, wherein the section of the graphic corresponding to the one or more GUI elements for the application when selected instructs the assistant device to cause the one or more devices to perform the functionality within the environment in accordance with the rule.

25. The computer program product of claim 24, wherein the rule includes a timer service.

26. The computer program product of claim 25, wherein the timer service initiates a count of time from selection of the section of the graphic corresponding to the one or more GUI elements for the application to determine when the count of time reaches a threshold time causing the one or more devices associated with the one or more device categories to perform the functionality within the environment using the assistant device.

\* \* \* \* \*